Nov. 3, 1970 R. S. ZEBARTH ET AL 3,537,128

POULTRY DEFEATHERING APPARATUS

Filed Oct. 20, 1967 3 Sheets-Sheet 1

INVENTORS.
Ralph S. Zebarth
Henry E. Frederick
BY John A. Hamilton
Attorney.

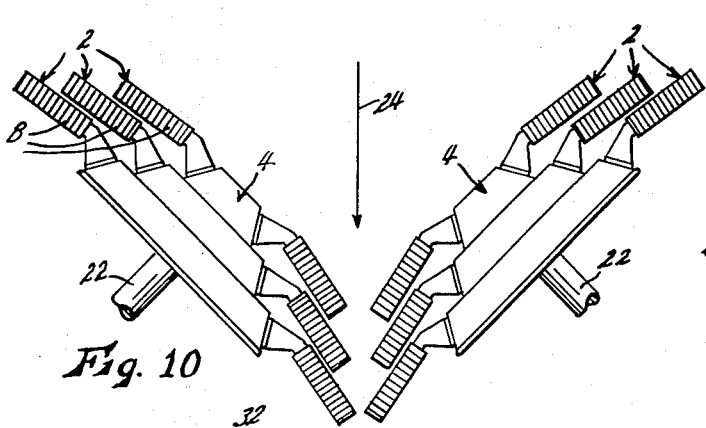
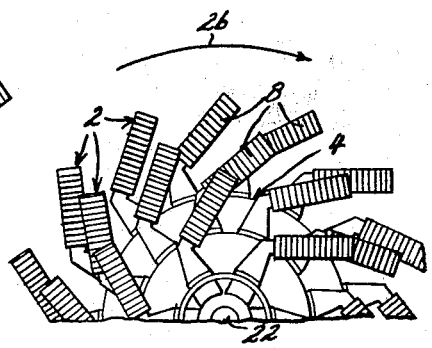
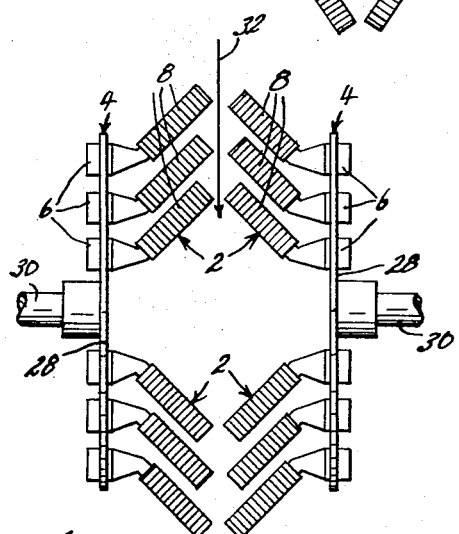
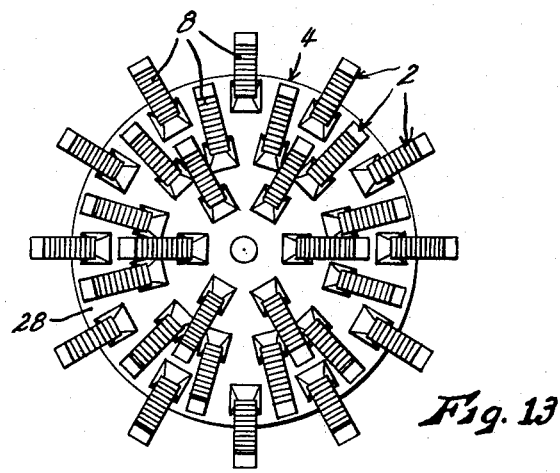
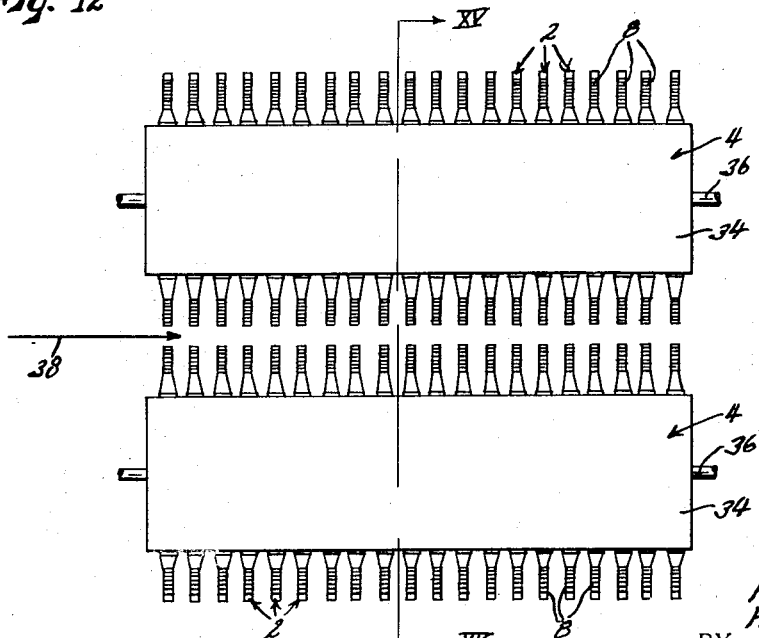

United States Patent Office 3,537,128
Patented Nov. 3, 1970

3,537,128
POULTRY DEFEATHERING APPARATUS
Ralph S. Zebarth and Henry E. Frederick, Kansas City, Mo., assignors, by mesne assignments, to Gordon Johnson Company, Kansas City, Mo., a corporation of Missouri
Filed Oct. 20, 1967, Ser. No. 676,795
Int. Cl. A22c *21/02*
U.S. Cl. 17—11.1                           1 Claim

ABSTRACT OF THE DISCLOSURE

A poultry defeathering apparatus including a finger mounting member rotatable about an axis and a set of elongated resilient fingers each having a base portion engaged in said mounting member and an operative portion extending outwardly from said mounting member to engage poultry conveyed adjacent thereto to remove feathers therefrom, the axis of the operative portion of each finger being non-aligned with the axis of its base portion. By varying the type, degree, and direction of non-alignment, there is provided a head which is readily adjusted to vary the degree of picking pressure of the fingers against the birds, and to provide a wider, more continuous and complete picking pattern for the fingers.

---

Figure 1:
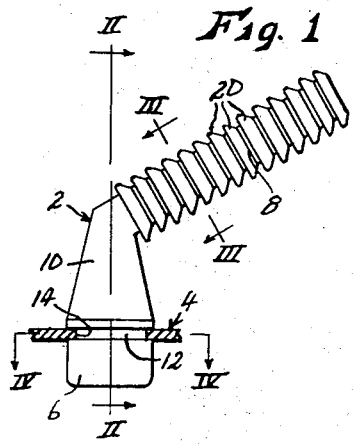

This invention relates to new and useful improvements in poultry defeathering apparatus, and has particular reference to poultry defeathering or "picking" apparatus of the type wherein birds are moved along a conveyor line and the feathers are removed therefrom by flexible fingers secured in mounting members disposed adjacent the path of poultry travel, the mounting member beining rotatable to provide high speed engagement of the fingers with the poultry carcasses. The mounting members may have various forms, such as straight or stepped drums rotatable about axes parallel with or angled relative to the path of poultry travel, flat discs confronting the path of travel, cones rotatable about their geometric axes and others.

A general difficulty with defeathering apparatus of this type has been their general lack of flexibility of operation to provide various degrees of "picking pressure" of the fingers against the birds, as may be desired. This variation may be regarded as a function of the effective stiffness of the fingers as they impinge against the bird. It is obvious that feathers which are comparatively easy to remove require fingers which are effectively less stiff, and that stiffer fingers will result in beating, battering, loosening of skin, and other damage to the carcasses, while feathers which are more difficult to remove require stiffer fingers, and that less stiff fingers will result in ineffective feather removal. The two classes of feathers are generally restricted to separate, distinct areas of the carcass. It would of course be possible to provide some solution to this problem by designing picking systems having fingers of different masses and stiffnesses arranged to engage different portions of the carcasses. However, this is an impractical solution, due to the expense of designing, purchasing and maintaining a stock of many different fingers. It is also possible to control the effective stiffness of the fingers, to vary their impact against the carcasses, by varying the rate of rotation of the mounting members by which the fingers are carried. This solution is also impractical, due to the expense of variable speed drives, and furthermore is rather ineffective since changes of rotational speed have rather erratic and unpredictable effects on the finger action. For example, increasing the rotational speed may effectively stiffen the fingers, but also may cause them to rebound so rapidly away from the carcasses that they do not have the "drag" or "wiping" action necessary to remove feathers efficiently, and conversely, reducing the rotational speed may effectively soften or reduce the stiffness of the fingers, but the reduced speed may also cause them to "flutter" aimlessly. In other words, changes of rotational speed have various effects not necessarily correlated with the changes of effective finger stiffness produced thereby. As a result, good picking machine practice has developed to require impact speeds of the fingers against the poultry carcasses within certain rather specific ranges.

Another general problem with pre-existing defeathering apparatus of this type has been that the fingers used generally require a base or mounting portion which is relatively large and bulky as compared to the operative or feather-engaging portion thereof. Thus, as a result of the space requirements of said base portions, and of other physical characteristics of the mounting members, there has often been an unavoidable considerable lateral spacing between the operative portions of adjacent fingers, so that as the mounting member is rotated, the fingers present only an interrupted, incomplete picking "face" to the carcasses.

Accordingly, the principal object of the present invention is the provision of a defeathering apparatus which offers a simple solution to the above described problems, in that the picking pressure or effective stiffness of the fingers may be adjusted to remove the feathers from the easy or difficult areas of the birds, without necessity either of using different fingers or of changing the rotational speeds of the mounting members. Also, the fingers may be so arranged to present a substantially solid and uninterrupted picking surface to the birds. Generally, this object is accomplished by the use of fingers which are not straight, that is, in which the axis of the operative portion of each finger is not axially aligned with the axis of its base or mounting portion. All flexible picking fingers of this general type have to our knowledge, been formed straight throughout their lengths. The operative portion may for example be either angled relative to said base portion, or transitionally offset therefrom, or both. The angled finger may be secured in the mounting member so that the operative portion thereof is disposed obliquely to the axis of rotation, so that it tends to be moved into radial relation to said axis by centrifugal force as said member is rotated. Hence it is pre-stressed when it engages the poultry carcasses. By setting each finger properly, it may be caused to be stressed in this manner either toward or away from the carcasses, or forwardly or rearwardly with respect to the direction of travel of the fingers. In general, stressing the fingers either toward the carcasses or into the direction of finger travel tends to stiffen the fingers to provide a higher picking pressure thereof against the carcasses, while stressing them away from the carcasses or against the direction the fingers travel tends to weaken the fingers or reduce the effective stiffness thereof, whereby to reduce the picking pressure of said fingers against the carcasses. The offset fingers may be variously engaged in the mounting member to provide nearly any desired transverse spacing between the operative portions of the fingers, to the general end that said fingers will, as the mounting member rotates, present a substantially continuous, unbroken picking face to the carcasses.

Other objects are simplicity and economy of construction, efficiency and dependability of operation, and adaptability for use in a wide variety of applications.

Figure 2:
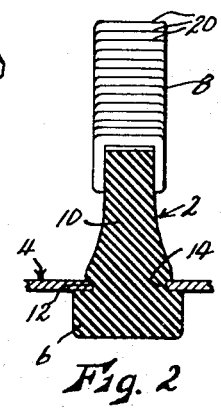
Figure 3:
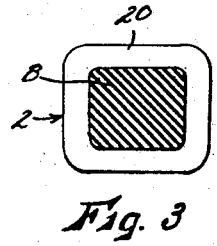
Figure 4:
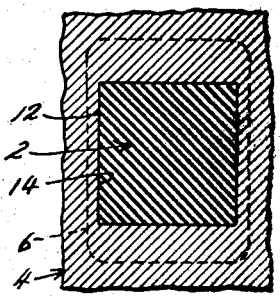
Figure 6:
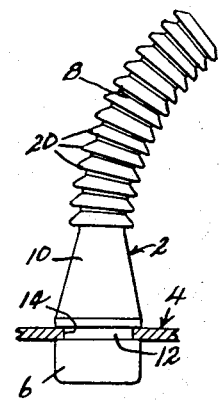
Figure 5:
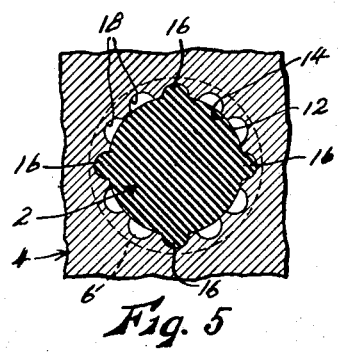
Figure 7:
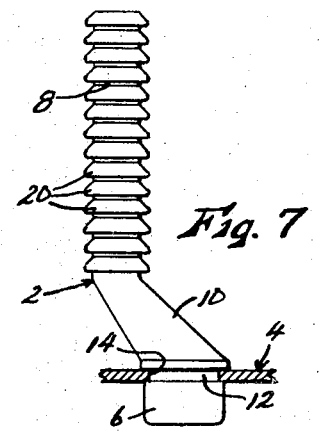
Figure 8:
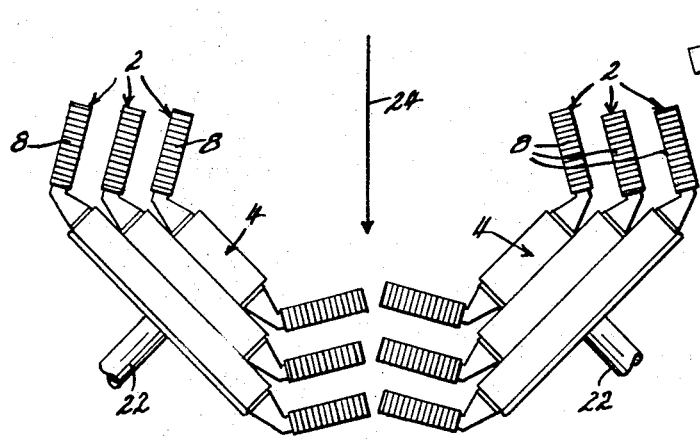
Figure 9:
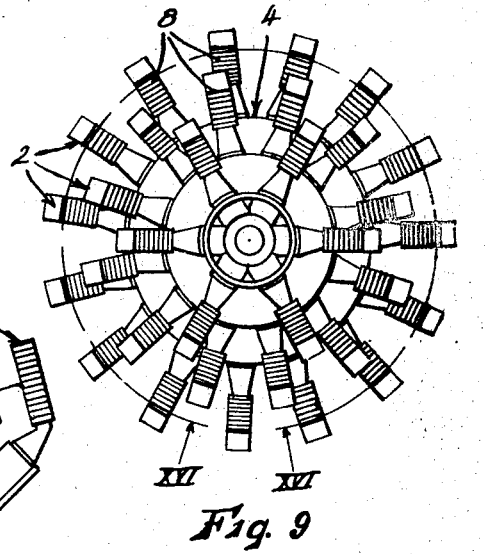

With these objects in view, as well as other objects which will appear in the course of the specification, reference will be had to the accompanying drawing, wherein:

FIG. 1 is a side elevational view of a picking finger for poultry defeathering machines embodying the present invention, operatively engaged in a fragmentarily shown mounting member, FIG. 2 is a fragmentary sectional view taken on line II—II of FIG. 1, FIG. 3 is an enlarged sectional view taken on line III—III of FIG. 1, FIG. 4 is an enlarged fragmentary sectional view taken on line IV—IV of FIG. 1, FIG. 5 is a view similar to FIG. 4, showing a modified construction, FIG. 6 is a view similar to FIG. 1, showing a finger of modified form, FIG. 7 is a view similar to FIG. 1, showing another modification of the finger form, FIG. 8 is a fragmentary top plan view of a poultry defeathering machine, showing a pair of picking heads of the stepped-drum type carrying picking fingers of the type shown in FIG. 1, only certain of said fingers being shown, FIG. 9 is an elevational face view of one of the picking heads shown in FIG. 8, including all of the fingers carried by said head, FIG. 10 is a view similar to FIG. 8, showing another arrangement of the fingers in the head, and a modified head, FIG. 11 is a fragmentary view similar to FIG. 9, but showing still another arrangement of the fingers, FIG. 12 is a view similar to FIG. 8, showing fingers of the type illustrated in FIG. 1, mounted in heads of the flat-disc-type.

Figure 15:
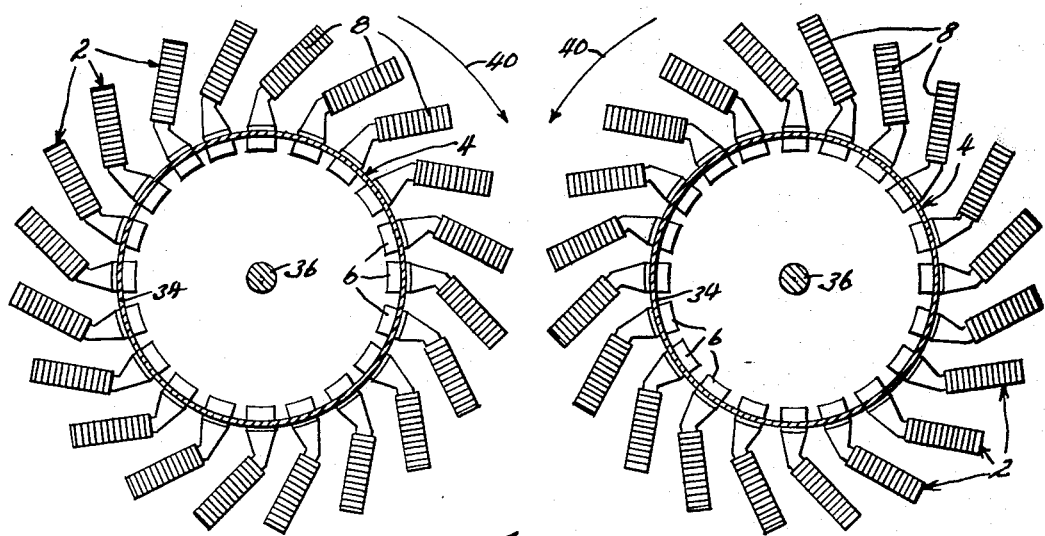
Figure 16:
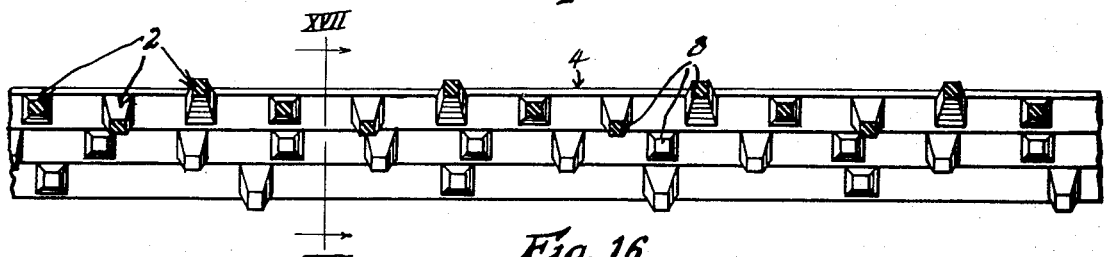
Figure 17:
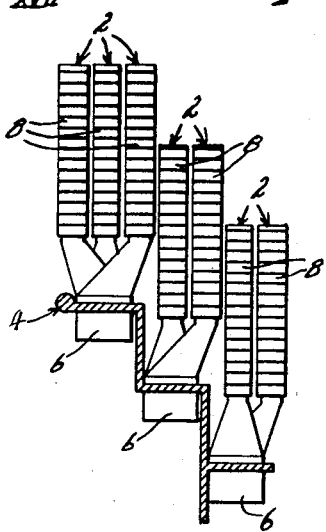

FIG. 13 is a face view of one of the heads shown in FIG. 12,

FIG. 14, is a view similar to FIG. 8, showing fingers of the type illustrated in FIG. 1 mounted in heads of the straight-drum type, FIG. 15 is an enlarged sectional view taken on line XV—XV of FIG. 14, FIG. 16 is a laid-out sectional view taken on curved line XVI—XVI of FIG. 9, but having fingers of the type illustrated in FIG. 7 mounted therein, and FIG. 17 is an enlarged sectional view taken on line XVII—XVII of FIG. 16.

Like reference numerals apply to similar parts throughout the several views, the numeral 2 applying generally to each of a series of elongated picking fingers adapted to be secured in a rotatable mounting member indicated generally by the numeral 4, so as to project outwardly from said mounting member so that when said member is rotated, said fingers will engage and remove feathers from poultry carcasses conveyed through path of rotary movement of said fingers, as will be described.

As shown, each finger comprises an elongated length of flexible, resilient material such as rubber, including a base portion 6 at one end thereof, an operative portion 8 at the opposite end thereof, and an intermediate portion 10 extending between and integrally interconnecting said base and operative portions. In each of the forms of the finger illustrated, said finger is adapted to be fixedly secured in the mounting member by means of a neck 12 of reduced cross sectional area formed in the base portion thereof, and which is adapted to be engaged in a hole 14 formed therefor in the mounting member, which has the form of a thin plate which is flat or curved. Since the finger is formed of rubber or other compressible material, the finger is adapted to be mounted simply by pulling it forcibly through hole 14 until the neck of the finger base snaps into engagement therewith.

For reasons which will presently appear, it is essential that the finger be capable of being inserted in the hole 14 at various positions of angular rotary adjustment about the longitudinal axis of its base portion, but that once so inserted it cannot rotate in said hole by accident or by the force of the blows delivered by the finger to poultry carcasses. FIGS. 4 and 5 show two structures for accomplishing this function. In FIG. 4, it will be seen that neck 12 is of square cross-sectional contour, and that hole 14 is correspondingly shaped. Thus the finger can be pulled into the hole in any of four different angular positions. A greater number of positions could be obtained by forming the neck and hole in hexagonal or other polygonal shape. A still greater number of positions could be obtained with the arrangement shown in FIG. 5, wherein neck 12 is circular except that it has one or more radial projections 16, and hole 14 has a series of notches 18 formed therein in regularly spaced angular relationship around the periphery thereof for receiving projections 16. With twelve notches as shown, the finger can be pulled into the hole in any of twelve different positions of angular adjustment about the axis of its base.

The operative portion 8 of each finger is the portion thereof which actually engages the poultry carcasses, and constitutes a major portion of the length thereof. As shown it is generally rectangular in cross-sectional contour, and has a series of ribs 20 formed peripherally thereabout for substantially its entire length. However, it is to be understood that the specific configuration of this operative finger portion is not pertinent to the present invention, and could take various forms. For example, it could be longitudinally tapered if desired, its cross-sectional contour could be square, round, oval or the like, and its surface roughening could have forms other than the peripheral ribs as shown.

In the form of the finger shown in FIG. 1, base portion 6 and intermediate portion 10 are axially aligned with operative portion 8 disposed at an obtuse angle to said base and intermediate portions. It can of course be formed with any desired angle. In the finger form shown in FIG. 6, the base and intermediate portions are also axially aligned, but operative portion 8 thereof is formed to assume an arcuate curve when relaxed, as shown. In the finger form shown in FIG. 7, the axes of the base and operative portions are parallel but transversely offset from each other, intermediate portion 10 being inclined to provide a connection therebetween. It will be understood that in some installations it may be desirable to intermingle the angled or offset fingers with straight fingers the axes of the base, intermediate and operative portions of which are all axially aligned. Such straight fingers are illustrated in FIGS. 16 and 17. Fingers of any of these forms may obviously be provided with the mounting means either of FIG. 4 or of FIG. 5.

FIGS. 8 and 9 show one usage of the angled fingers of FIG. 1 in an actual defeathering machine. In that machine, the mounting member 4 constitutes a hollow drum having stepped diameters, mounted on a shaft 22 for rotation therewith, and a series of fingers 2 are mounted in angularly spaced relation in each of the steps of the drum. The fingers extend outwardly from said drums. There are provided a pair of said drums mounted in opposed relation respectively at opposite sides of a horizontal path of poultry travel represented by arrow 24, along which the poultry carcasses are moved by a suitable conveyor system, not shown, whereby to be acted upon by the fingers of both drums as said carcasses are moved therebetween, whereby feathers are removed from said carcasses. Each picking machine usually includes a plurality of opposed pairs of drums, although they are not shown as being unnecessary to a full understanding of the invention, and each bird passes successively between the drum pairs. Also, means may be provided for varying the angle between shafts 22 and the vertical plane of poultry travel as represented by arrow 24. The means for mounting the drums, and rotatably driving them, are not shown, though well known in the art. In FIGS. 8 and 9 the fingers 2 are so installed that the operative portions 8 thereof are normally inclined from a radial position, with respect to shafts 22, toward the vertical plane of poultry travel.

For an understanding of the operational effect of angling the fingers as shown, it should be understood that the picking of feathers is accomplished by two longitudinal faces of the operative portion 8 of each finger, the leading face thereof with respect to its direction of rotation about shaft 22, and the face thereof confronting the vertical plane 24 of poultry travel, the former being the more important. Thus it will be seen that with the fingers angled as shown in FIG. 8, rotation of the drums will cause the operative portions 8 of the fingers to be bowed or flexed toward radial positions relative to shafts 22, by virtue of centrifugal force. This flexure is essentially in a direction away from the vertical plane 24 of poultry travel. Hence when the faces of the fingers confronting said plane engage the poultry carcasses, said fingers are already pre-stressed toward said plane, and hence have a greater effective stiffness or strength, and hence deliver a greater blow to the poultry carcasses, than they would if the fingers were normally radial to the drums and were not flexed by centrifugal force at the moment of impact with the carcasses. As previously discussed, this finger action may be highly advantageous when removing feathers from portions of the bird in which the feathers are tightly held and difficult to remove. The degree of stiffening obtained can be varied either by using fingers having different angles, or by varying the contour of the drums to change the angle of the operative portions 8 of the fingers relative to the axis of rotation.

In FIG. 10 the fingers 2 are so installed in the drums that the operative portions 8 thereof are normally angled oppositely to those shown in FIG. 8, or away from the vertical plane 24 of poultry travel. To avoid interference between fingers, this may necessitate the use of fingers having different angles, or drums of slightly different configuration, as shown. With the fingers thus angled, it will be seen that as the drums are rotated, the operative portions 8 of the fingers will be flexed toward plane 24, and thus pre-stressed away from said plane, as they engage the birds, thus they are more easily deflected by impact with the bird than they would be if they were normally radial, and are hence effectively weakened, delivering a softer blow. As previously discussed, this finger arrangement is advantageous and would be used in drums positioned to remove feathers from portions of the poultry carcasses in which the feathers are loosely held and easy to remove.

In FIG. 11, the fingers are so installed in the drum that the operative portions 8 thereof are normally inclined forwardly in their direction of rotation, as indicated by arrow 26. With this arrangement, the operative portions 8 of the fingers are flexed by centrifugal force in a direction opposite to their rotation, so that they are pre-stressed forwardly in their direction of rotation when they engage the carcasses. This produces the finger-stiffening effect already discussed. Conversely, the fingers may be installed so that their operative portions 8 are normally inclined opposite to their direction of rotation. In that case, the fingers are flexed by centrifugal force forwardly in their direction of rotation, and are hence pre-stressed in the opposite direction, as they engage the birds. This produces the finger-softening effect already mentioned. Actually, the effects produced by inclining the fingers forwardly or rearwardly in their direction of rotation are more pronounced than those obtained by inclining said fingers toward or away from the plane of poultry travel, since it is the leading faces of said fingers which perform the greater portion of the feather removal.

The inclination of the fingers in any of the four directions already mentioned can be obtained with the finger mounting means of FIG. 4, simply by pulling neck 12 into hole 14 in any one of the four different angular positions permitted by the square configuration thereof. However, in some cases it may be desirable to use finger adjustments of the angular position of each finger, as permitted by the mounting means of FIG. 5. Possibly the greatest finger-stiffening effect can be obtained by angling the fingers both forwardly in their direction of rotation and also toward the plane 24 of poultry travel, and the greatest finger-softening effect can be obtained by angling the fingers both opposite to their direction of rotation and also away from plane 24.

The curved finger 2 of FIG. 6 may be viewed as a variation of the angled finger of FIG. 1, and has use particularly when the fingers are angled for a stiffening effect, as in FIGS. 8 and 11. In these usages, when the operative portions 8 of the fingers are straight as in FIG. 1, they are so flexed by centrifugal force that the operative faces thereof tend to engage the carcasses while in a convexly curved or bowed position. This reduces the area of contact between each finger and the carcass, and hence tends to reduce the feather-removing efficiency of the finger. However, with the fingers curved as in FIG. 6, the operative portion 8 thereof tends to be straightened by centrifugal force, so as to engage the carcass while in a relatively straight position, thus providing a greater area of contact and better efficiency.

FIGS. 12 and 13 show another type of defeathering machine wherein the fingers 2 are engaged in mounting members 4 constituting a pair of flat discs 28 each carried for rotation about its geometric axis by a shaft 30, and confronting each other respectively at opposite side of the vertical plane of poultry travel as indicated by arrow 32. The discs are shown parallel, with shafts 30 coaxially aligned, but said shafts obviously could be relatively angled as shown in FIG. 8. The fingers 2 in FIGS. 12–13 are shown installed with their operative portions 8 angled radially outwardly from shafts 30, whereby they are flexed by centrifugal force away from plane 32, and hence pre-stressed toward said plane, whereby to produce the finger-stiffening effect described in connection with FIG. 8. However, the fingers of FIGS. 12–13 also obviously could be pulled into the disc to be angled radially inwardly, whereby to be flexed toward and pre-stressed away from plane 32, to produce the finger-softening effect described in connection with FIG. 10, or to be angled either forwardly or rearwardly in their direction of rotation to produce the stiffening or softening effect described in connection with FIG. 11.

FIGS. 14 and 15 show the application of the angled finger to a type of defeathering machine in which the finger mounting members 4 constitute a pair of straight cylindrical drums 34, each drum carried on a shaft 36 for rotation about its geometric axis. Said drums are horizontal and generally parallel, being disposed respectively at opposite sides of the vertical plane of horizontal poultry travel as indicated by arrow 38 in FIG. 14. Fingers 2 are affixed in said drums and extend outwardly therefrom to engage birds moving along said path of travel. As shown, the fingers are so engaged in the drums that operative portions 8 of said fingers are angled forwardly in the direction of rotation of the drums, as indicated by arrows 40 in FIG. 15. This produces the finger-stiffening effect as already discussed. However, they obviously could also be mounted to be angled oppositely to their direction of rotation, whereby to produce the described finger-softening effect, could be angled longitudinally of the drum opposite to the direction of arrow 38 to produce a finger-stiffening effect, or could be angled longitudinally of the drums in the direction of arrow 38 whereby to produce a finger-softening effect, all as determined by the angular position of each finger about the axis of its base portion as said finger is pulled into its hole 14 of the mounting member.

While the stepped drum, straight drum and disc types of defeathering machines may not exhaust all of the on-line defeathering machines in use, they are at least typically representative of all pickers presently in use within our knowledge, and are believed to show amply that the angled-finger concept has general application to any defeathering machine wherein elongated resilient fingers are secured in a rotatable mounting member and project outwardly therefrom to engage and remove feathers from poultry carcasses as the latter are moved adjacent said mounting member, and that in any such application said angled fingers may be positioned so as to provide selective increase or decrease of the effective stiffness of said fingers as they engage the birds.

FIGS. 16 and 17 show an application of the offset finger illustrated in FIG. 7. Taking for example the picking head illustrated in FIG. 8, the finger arrangement therein is subject to certain difficulties. For one thing, the base portions of the fingers must be arranged in a peripheral row on each step of the drum. As a result, it will be seen that each finger in each row, as it engages a poultry carcass, tends to be bent or deflected toward the next following finger, and often tends to screen or shield at least a portion of said following finger from engaging the bird at all. This of course reduces the effective picking length of said following finger, and hence lowers the efficiency of the entire machine. This effect would be reduced if fewer fingers, with a greater angular spacing therebetween, were used in each peripheral row, but fewer fingers would also result in lower feather removing capacity. Another difficulty is that with the fingers mounted in peripheral rows as in FIG. 8, the added bulk and greater lateral dimensions of the base portions of the fingers, which is required to support the operative portions of the fingers in adjacent rows. This lateral spacing is well illustrated in FIG. 8, and the result thereof is that the leading faces of the fingers, as the drums rotate do not present a continuous, unbroken area to the birds, but instead tend to engage the birds only along the lines of the fingers, and not in the spaces between the fingers of adjacent rows. This can result in spotty, inefficient picking.

The offset finger of FIG. 7, intermingled with straight fingers as described, provides a solution to these difficulties. As shown in FIGS. 16 and 17, the smallest section of the drum is provided with alternately straight and offset fingers, the offset fingers being so inserted that their operative portions 8 are offset toward the small end of the drum. The next larger section of the drum is similarly provided with alternate straight and offset fingers, and the largest section of the drum is also provided with straight and offset fingers, some of the offset fingers having their operative portions offset toward the small end of the drum, and others offset toward the large end of the drum. The degree of lateral offset of said offset fingers may be so regulated as to be equal to one-half of the spacing between straight fingers in adjacent peripheral rows. Thus as the fingers are rotated, their leading faces present to the poultry a picking surface or pattern as shown in FIG. 17. This solves both of the difficulties described above. First, as is clearly evident from a consideration of FIGS. 16 and 17, the offset fingers have their operative portions disposed in peripheral rows intermediate the peripheral rows of the straight fingers, considered longitudinally of the drum. This "fills in" the lateral gaps between adjacent rows of fingers as shown in FIG. 8, hence provides a substantially continuous, unbroken picking surface of "pattern." Moreover, the forward offset of some fingers in the smallest section of the drum, and rearward offset of some of the fingers in the largest section of the drum, provides a broader picking pattern without requiring lengthening of the drum. Secondly, since the operative portions of no two successive fingers in any section of the drum move in the same path, but are spaced apart longitudinally of the drum, no finger can shield or cover any portion of the operative portion of the following finger.

Finally, although not specifically illustrated, it will be obvious that the angling of the fingers, as shown in FIG. 1, could be combined with the offset feature as shown in FIG. 7, in a single finger. For example, a single finger could be provided having an intermediate portion 10 angled with respect to the axis of the base portion 6, and having an operative portion 8 extending from the outer end of said intermediate portion in obliquely inclined relation to the axis of the base portion. In this manner the advantages of improved picking pattern and elimination of finger interference flowing from the offset concept could be combined with the advantages of selective finger-stiffening or finger-softening flowing from the angling concept.

While we have shown and described certain specific embodiments of our invention, it will be readily apparent that many minor changes of structure and operation could be made without departing from the spirit of the invention as defined by the scope of the appended claim.

What is claimed as new and desired to be protected by Letters Patent is:

1. A picking head for poultry defeathering machines, said picking head comprising:
   a rigid mounting member rotatable about an axis and adapted to be disposed adjacent a path along which poultry is conveyed,
   a series of flexible, resilient, elongated fingers each having a base portion at one end thereof and an operative portion at the opposite end thereof, the axis of said operative portion being non-aligned with the axis of said base portion, and
   means securing the base portion of each of said fingers in said mounting member whereby the operative portions extend outwardly therefrom to engage poultry moving along said path of travel,
   said means securing the base portion of each of said fingers in said mounting member being adjustable to permit securing of said finger selectively at any of a plurality of positions of angular rotation about the axis of said base portion,
   said mounting member constituting a thin, planar member,
   said securing means for each finger constituting a reduced neck of the base portion of said finger and a cooperating aperture in said mounting member,
   said finger being adapted to be pulled through said aperture to engage said neck in said aperture,
   said neck being rotatably adjustable about its axis within said aperature,
   said aperture being notched outwardly at angular intervals about the periphery thereof,
   said neck being provided with a radial projection adapted to be pulled selectively into engagement with any of the notches of said aperture.

References Cited

UNITED STATES PATENTS

| | | | |
|---|---|---|---|
| 2,295,761 | 9/1942 | Smith | 17—11.1 |
| 2,436,214 | 2/1948 | Johnson | 17—11.1 |
| 2,862,230 | 12/1958 | Corey et al. | 17—11.1 |
| 3,218,668 | 11/1965 | Engkjer et al. | 17—45 |
| 2,444,556 | 7/1948 | Drews | 17—11.1 |
| 2,571,034 | 10/1951 | Harvey | 17—11.1 |

FOREIGN PATENTS

| | | |
|---|---|---|
| 483,543 | 8/1953 | Italy. |
| 116,500 | 1/1943 | Australia. |

LUCIE H. LAUDENSLAGER, Primary Examiner